US012035455B2

(12) United States Patent
Hegelich et al.

(10) Patent No.: US 12,035,455 B2
(45) Date of Patent: Jul. 9, 2024

(54) PARTICLE-ASSISTED WAKEFIELD ELECTRON ACCELERATION DEVICES

(71) Applicant: BOARD OF REGENTS, THE UNIVERSITY OF TEXAS SYSTEM, Austin, TX (US)

(72) Inventors: Bjorn Manuel Hegelich, Austin, TX (US); Constantin Aniculaesei, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 29 days.

(21) Appl. No.: 17/845,223

(22) Filed: Jun. 21, 2022

(65) Prior Publication Data

US 2022/0408542 A1 Dec. 22, 2022

Related U.S. Application Data

(60) Provisional application No. 63/212,889, filed on Jun. 21, 2021.

(51) Int. Cl.
*H05H 15/00* (2006.01)

(52) U.S. Cl.
CPC .................................. *H05H 15/00* (2013.01)

(58) Field of Classification Search
None
See application file for complete search history.

(56) References Cited

U.S. PATENT DOCUMENTS

| | | | | |
|---|---|---|---|---|
| 8,299,713 | B2 | 10/2012 | Hooker et al. | |
| 2005/0279947 | A1 | 12/2005 | Feurer et al. | |
| 2014/0131594 | A1 | 5/2014 | Hidding et al. | |
| 2017/0099724 | A1* | 4/2017 | Tajima | H05H 15/00 |
| 2019/0239332 | A1 | 8/2019 | Hidding et al. | |
| 2020/0335237 | A1 | 10/2020 | Hooker et al. | |
| 2021/0274631 | A1* | 9/2021 | Thaury | H05H 1/54 |

OTHER PUBLICATIONS

International Search Report and Written opinion issued for Application No. PCT/US2022/034275, dated Sep. 16, 2022. 12 pages.
Aniculaesei C et al. Proof-of-Principle Experiment for Nanoparticle-Assisted Laser Wakefield Electron Acceleration. Physical Review Applied. 108, 12, 044041.
Aniculaesei C et al., Electron energy increase in a laser wakefield accelerator using up-ramp plasma density profiles, Scientific Reports, 2019, 9, 11249.
Cho MH et al. Controlled electron injection facilitated by nanoparticles for laser wakefield acceleration. Scientific Reports. 2018, 8, 16924.
Doe-Ofs: "Advanced Accelerator Development Strategy Report", Technical Report published Feb. 3, 2016. Accessed online Jul. 8, 2022 at: https://doi.org/10.2172/1358081.

(Continued)

*Primary Examiner* — Srinivas Sathiraju
(74) *Attorney, Agent, or Firm* — Meunier Carlin & Curfman LLC

(57) ABSTRACT

Disclosed herein are particle-assisted wakefield electron acceleration devices, accelerated electrons generated using said devices, and methods of use thereof.

16 Claims, 4 Drawing Sheets

(56) References Cited

OTHER PUBLICATIONS

Milchberg H et al. Workshop on Opportunities, Challenges, and Best Practices for Basic Plasma Science User Facilities, Workshop Report, May 20-21, 2019, Maryland, arXiv:1910.09084.

Moschuering N et al. First fully kinetic three-dimensional simulation of the AWAKE baseline scenario, Plasma Physics and Controlled Fusion, 2019, 61, 104004.

Sheffield R et al. Matter-Radiation Interactions In Extremes (Marie): Project Overview, 38th International Free Electron Laser Conference, Published Sep. 1, 2017, LA-UR-17-27562.

Tsai HE. Tunable Quasi-monoenergetic Compton X-ray source from Laser-plasma Accelerator. Dissertation. UT Austin (2015).

Wang, X. et al. Quasi-monoenergetic laser-plasma acceleration of electrons to 2 GeV. Nature Communications. 2013, 4, 1988.

* cited by examiner

PARTICLE-ASSISTED WAKEFIELD ELECTRON ACCELERATION DEVICES

CROSS-REFERENCE TO RELATED APPLICATIONS

This application claims the benefit of priority to U.S. Provisional Application No. 63/212,889 filed Jun. 21, 2021, which is hereby incorporated herein by reference in its entirety.

STATEMENT OF GOVERNMENT SUPPORT

This invention was made with government support under Grant No. FA9550-17-1-0264 awarded by the Air Force Office of Scientific Research. The government has certain rights in the invention.

BACKGROUND

Laser-wakefield acceleration has the potential of shrinking ~km scale facilities down to room size machines. A primary research goal worldwide is to keep the acceleration process active long enough to reach >10 GeV electron energy in a single acceleration stage. The devices, methods, and systems discussed herein address these and other needs.

SUMMARY

In accordance with the purposes of the disclosed devices, methods, and systems as embodied and broadly described herein, the disclosed subject matter relates to particle-assisted wakefield electron acceleration devices accelerated electrons generated using said devices, and methods of use thereof.

Additional advantages of the disclosed devices, systems, and methods will be set forth in part in the description which follows, and in part will be obvious from the description. The advantages of the disclosed devices, systems, and methods will be realized and attained by means of the elements and combinations particularly pointed out in the appended claims. It is to be understood that both the foregoing general description and the following detailed description are exemplary and explanatory only and are not restrictive of the disclosed devices, systems, and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
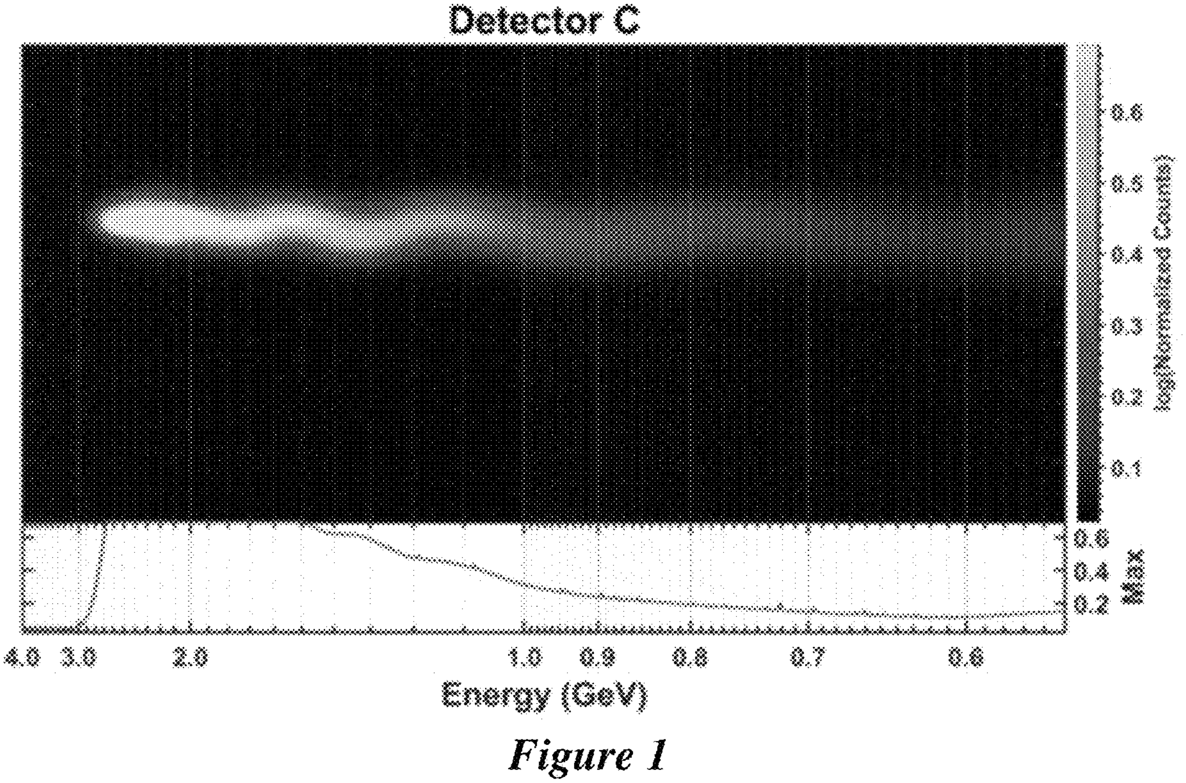
FIG. 1. Wakefield acceleration at Texas Petawatt Laser with no nanoparticles results in a broad electron spectrum with 2-3 GeV peak energy.

The devices, methods, and systems described herein may be understood more readily by reference to the following detailed description of specific aspects of the disclosed subject matter and the Examples included therein.

Before the present devices, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4%, 3%, 2%, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the end-points of each of the ranges are significant both in relation to the other endpoint, and independently of the other endpoint.

Values can be expressed herein as an "average" value. "Average" generally refers to the statistical mean value.

By "substantially" is meant within 5%, e.g., within 4%, 3%, 2%, or 1%.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Figure 5:
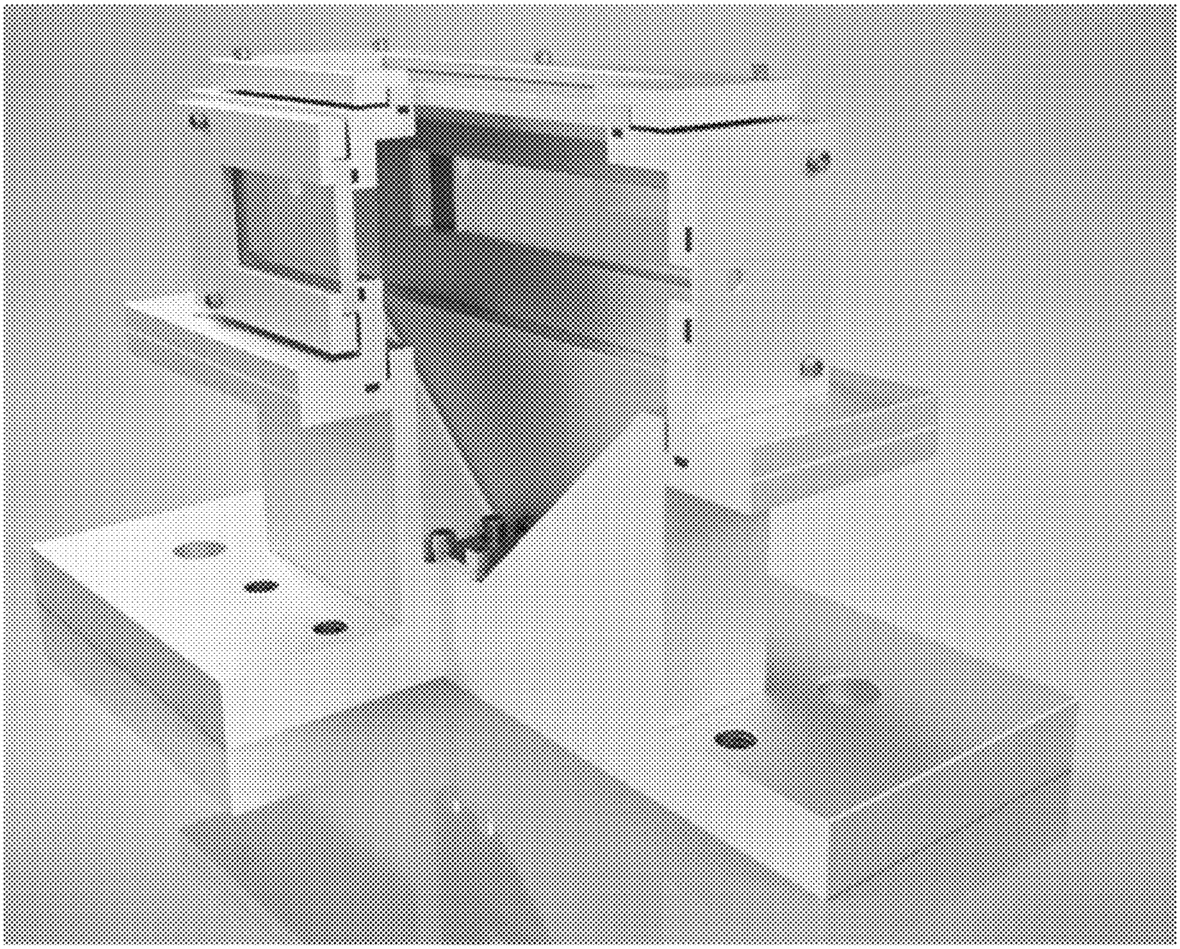
FIG. 5 is a schematic illustration of an example gas cell, with a partial cut away view.

Disclosed herein are particle-assisted wakefield electron acceleration devices. For example, disclosed herein are particle-assisted wakefield electron acceleration devices comprising: an accelerator chamber (e.g., a single accelerator chamber) comprising a gas cell. An example gas cell is shown in FIG. 5.

The accelerator chamber (e.g., the gas cell) can, for example, have a length of 0.5 centimeters (cm) or more (e.g., 0.6 cm or more, 0.7 cm or more, 0.8 cm or more, 0.9 cm or more, 1 cm or more, 1.25 cm or more, 1.5 cm or more, 1.75 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 11 cm or more, 12 cm or more, 13 cm or more, 14 cm or more, 15 cm or more, 16 cm or more, 17 cm or more, 18 cm or more, 19 cm or more, 20 cm or more, 25 cm or more, 30 cm or more, 35 cm or more, 40 cm or more, 45 cm or more, 50 cm or more, 60 cm or more, 70 cm or more, 80 cm or more, 90 cm or more, 100 cm or more, 125 cm or more, 150 cm or more, 175 cm or more, 200 cm or more, 225 cm or more, 250 cm or more, 275 cm or more, 300 cm or more, 325 cm or more, 350 cm or more, 375 cm or more, 400 cm or more, 425 cm or more, 450 cm or more, or 475 cm or more). In some examples, the accelerator chamber (e.g., the gas cell) can have a length of 500 cm or less (e.g., 475 cm or less, 450 cm or less, 425 cm or less, 400 cm or less, 375 cm or less, 350 cm or less, 325 cm or less, 300 cm or less, 275 cm or less, 250 cm or less, 225 cm or less, 200 cm or less, 175 cm or less, 150 cm or less, 125 cm or less, 100 cm or less, 90 cm or less, 80 cm or less, 70 cm or less, 60 cm or less, 50 cm or less, 45 cm or less, 40 cm or less, 35 cm or less, 30 cm or less, 25 cm or less, 20 cm or less, 19 cm or less, 18 cm or less, 17 cm or less, 16 cm or less, 15 cm or less, 14 cm or less, 13 cm or less, 12 cm or less, 11 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, 2.5 cm or less, 2 cm or less, 1.75 cm or less, 1.5 cm or less, 1.25 cm or less, 1 cm or less, 0.9 cm or less, 0.8 cm or less, 0.7 cm or less, or 0.6 cm or less). The length of the accelerator chamber (e.g., the gas call) can range from any of the minimum values described above to any of the maximum values described above. For example, the accelerator chamber (e.g., the gas cell) can have a length of from 0.5 centimeters (cm) to 500 cm (e.g., from 0.5 cm to 250 cm, from 250 cm to 500 cm, from 0.5 cm to 5 cm, from 5 cm to 50 cm, from 50 cm to 500 cm, from 1 cm to 500 cm, from 0.5 cm to 450 cm, from 1 cm to 450 cm, from 0.5 cm to 400 cm, from 0.5 cm to 200 cm, from 0.5 cm to 100 cm, from 1 cm to 50 cm, or from 10 cm to 20 cm).

In some examples, the accelerator chamber (e.g., the gas cell) has a volume of 0.05 $cm^3$ or more (e.g., 0.06 $cm^3$ or more; 0.07 $cm^3$ or more; 0.08 $cm^3$ or more; 0.09 $cm^3$ or more; 0.1 $cm^3$ or more; 0.2 $cm^3$ or more; 0.3 $cm^3$ or more; 0.4 $cm^3$ or more; 0.5 $cm^3$ or more; 0.75 $cm^3$ or more; 1 $cm^3$ or more; 1.25 $cm^3$ or more; 1.5 $cm^3$ or more; 1.75 $cm^3$ or more; 2 $cm^3$ or more; 2.25 $cm^3$ or more; 2.5 $cm^3$ or more; 3 $cm^3$ or more; 3.5 $cm^3$ or more; 4 $cm^3$ or more; 4.5 $cm^3$ or more; 5 $cm^3$ or more; 6 $cm^3$ or more; 7 $cm^3$ or more; 8 $cm^3$ or more; 9 $cm^3$ or more; 10 $cm^3$ or more; 15 $cm^3$ or more; 20 $cm^3$ or more; 25 $cm^3$ or more; 30 $cm^3$ or more; 35 $cm^3$ or more; 40 $cm^3$ or more; 45 $cm^3$ or more; 50 $cm^3$ or more; 60 $cm^3$ or more; 70 $cm^3$ or more; 80 $cm^3$ or more; 90 $cm^3$ or more; 100 $cm^3$ or more; 125 $cm^3$ or more; 150 $cm^3$ or more; 175 $cm^3$ or more; 200 $cm^3$ or more; 225 $cm^3$ or more; 250 $cm^3$ or more; 275 $cm^3$ or more; 300 $cm^3$ or more; 350 $cm^3$ or more; 400 $cm^3$ or more; 450 $cm^3$ or more; 500 $cm^3$ or more; 600 $cm^3$ or more; 700 $cm^3$ or more; 800 $cm^3$ or more; 900 $cm^3$ or more; 1000 $cm^3$ or more; 1250 $cm^3$ or more; 1500 $cm^3$ or more; 1750 $cm^3$ or more; 2000 $cm^3$ or more; 2250 $cm^3$ or more; 2500 $cm^3$ or more; 3000 $cm^3$ or more; 3500 $cm^3$ or more; 4000 $cm^3$ or more; 4500 $cm^3$ or more; 5000 $cm^3$ or more; 6000 $cm^3$ or more; 7000 $cm^3$ or more; 8000 $cm^3$ or more; 9000 $cm^3$ or more; 10,000 $cm^3$ or more; 12,500 $cm^3$ or more; 15,000 $cm^3$ or more; 17,500 $cm^3$ or more; 20,000 $cm^3$ or more; 22,500 $cm^3$ or more; 25,000 $cm^3$ or more; 30,000 $cm^3$ or more; 35,000 $cm^3$ or more; 40,000 $cm^3$ or more; 45,000 $cm^3$ or more; 50,000 $cm^3$ or more; 60,000 $cm^3$ or more; 70,000 $cm^3$ or more; 80,000 $cm^3$ or more; 90,000 $cm^3$ or more; 100,000 $cm^3$ or more; 125,000 $cm^3$ or more; 150,000 $cm^3$ or more; 175,000 $cm^3$ or more; 200,000 $cm^3$ or more; 225,000 $cm^3$ or more; 250,000 $cm^3$ or more; 300,000 $cm^3$ or more; 350,000 $cm^3$ or more; 400,000 $cm^3$ or more; or 450,000 $cm^3$ or more).

In some examples, the accelerator chamber (e.g., the gas cell) has a volume of 500,000 $cm^3$ or less (e.g., 450,000 $cm^3$ or less; 400,000 $cm^3$ or less; 350,000 $cm^3$ or less; 300,000 $cm^3$ or less; 250,000 $cm^3$ or less; 225,000 $cm^3$ or less; 200,000 $cm^3$ or less; 175,000 $cm^3$ or less; 150,000 $cm^3$ or less; 125,000 $cm^3$ or less; 100,000 $cm^3$ or less; 90,000 $cm^3$ or less; 80,000 $cm^3$ or less; 70,000 $cm^3$ or less; 60,000 $cm^3$ or less; 50,000 $cm^3$ or less; 45,000 $cm^3$ or less; 40,000 $cm^3$ or less; 35,000 $cm^3$ or less; 30,000 $cm^3$ or less; 25,000 $cm^3$ or less; 22,500 $cm^3$ or less; 20,000 $cm^3$ or less; 17,500 $cm^3$ or less; 15,000 $cm^3$ or less; 12,500 $cm^3$ or less; 10,000 $cm^3$ or less; 9000 $cm^3$ or less; 8000 $cm^3$ or less; 7000 $cm^3$ or less; 6000 $cm^3$ or less; 5000 $cm^3$ or less; 4500 $cm^3$ or less; 4000 $cm^3$ or less; 3500 $cm^3$ or less; 3000 $cm^3$ or less; 2500 $cm^3$ or less; 2250 $cm^3$ or less; 2000 $cm^3$ or less; 1750 $cm^3$ or less; 1500 $cm^3$ or less; 1250 $cm^3$ or less; 1000 $cm^3$ or less; 900 $cm^3$ or less; 800 $cm^3$ or less; 700 $cm^3$ or less; 600 $cm^3$ or less; 500 $cm^3$ or less; 450 $cm^3$ or less; 400 $cm^3$ or less; 350 $cm^3$ or less; 300 $cm^3$ or less; 275 $cm^3$ or less; 250 $cm^3$ or less; 225

$cm^3$ or less; 200 $cm^3$ or less; 175 $cm^3$ or less; 150 $cm^3$ or less; 125 $cm^3$ or less; 100 $cm^3$ or less; 90 $cm^3$ or less; 80 $cm^3$ or less; 70 $cm^3$ or less; 60 $cm^3$ or less; 50 $cm^3$ or less; 45 $cm^3$ or less; 40 $cm^3$ or less; 35 $cm^3$ or less; 30 $cm^3$ or less; 25 $cm^3$ or less; 20 $cm^3$ or less; 15 $cm^3$ or less; 10 $cm^3$ or less; 9 $cm^3$ or less; 8 $cm^3$ or less; 7 $cm^3$ or less; 6 $cm^3$ or less; 5 $cm^3$ or less; 4.5 $cm^3$ or less; 4 $cm^3$ or less; 3.5 $cm^3$ or less; 3 $cm^3$ or less; 2.5 $cm^3$ or less; 2.25 $cm^3$ or less; 2 $cm^3$ or less; 1.75 $cm^3$ or less; 1.5 $cm^3$ or less; 1.25 $cm^3$ or less; 1 $cm^3$ or less; 0.75 $cm^3$ or less; 0.5 $cm^3$ or less; 0.4 $cm^3$ or less; 0.3 $cm^3$ or less; 0.2 $cm^3$ or less; 0.1 $cm^3$ or less; 0.09 $cm^3$ or less; 0.08 $cm^3$ or less; 0.07 $cm^3$ or less; or 0.06 $cm^3$ or less).

The volume of the accelerator chamber (e.g., the gas cell) can range from any of the minimum values described above to any of the maximum values described above. For example, the accelerator chamber (e.g., the gas cell) can have a volume of from 0.05 $cm^3$ to 500.00 $cm^3$ (e.g., from 0.05 $cm^3$ to 500 $cm^3$; from 500 $cm^3$ to 500,000 $cm^3$; from 0.05 $cm^3$ to 0.5 $cm^3$; from 0.5 $cm^3$ to 5 $cm^3$; from 5 $cm^3$ to 50 $cm^3$; from 50 $cm^3$ to 500 $cm^3$; from 500 $cm^3$ to 5000 $cm^3$; from 5000 $cm^3$ to 50,000 $cm^3$; from 50,000 $cm^3$ to 500,000 $cm^3$; from 0.05 $cm^3$ to 450,000 $cm^3$; from 0.5 $cm^3$ to 50,000 $cm^3$; or from 0.5 $cm^3$ to 450,000 $cm^3$).

The accelerator chamber includes a low density gas and a particle therein. The low density gas can comprise any suitable gas. In some examples, the low density gas comprises hydrogen, helium, nitrogen, and the like, or a combination thereof. In some examples, the low density gas comprise helium.

The accelerator chamber has a proximal end and a distal end, the proximal end being the end configured to receive the pulse. In some examples, the particle is located at or near the proximal end of the accelerator chamber. In some examples, the particle can be located at or near the distal end of the accelerator chamber. In some examples, the particle comprises a plurality of particles distributed throughout the accelerator chamber. The plurality of particles can, for example, be distributed throughout the accelerator chamber homogeneously, inhomogeneously, in an order, or randomly.

As used herein, "a particle" and "the particle" are meant to include any number of particles in any arrangement. In some examples, the particle is a single particle. In some examples, the particle is a plurality of particles (e.g., 2 or more; 3 or more; 4 or more; 5 or more; 10 or more; 15 or more; 20 or more; 25 or more; 30 or more; 40 or more; 50 or more; 75 or more; 100 or more; 150 or more; 200 or more; 250 or more; 300 or more; 400 or more; 500 or more; 750 or more; 1000 or more; 1500 or more; 2000 or more; 2500 or more; 3000 or more; 4000 or more; 5000 or more; 7500 or more; $1\times10^4$ or more; $2.5\times10^4$ or more; $5\times10^4$ or more; $7.5\times10^4$ or more; $1\times10^5$ or more; $2.5\times10^5$ or more; $5\times10^5$ or more; $7.5\times10^5$ or more; $1\times10^6$ or more; $5\times10^6$ or more; $1\times10^7$ or more; $5\times10^7$ or more; $1\times10^8$ or more; $5\times10^8$ or more; $1\times10^9$ or more; $5\times10^9$ or more; $1\times10^{10}$ or more; $1\times10^{11}$ or more; $1\times10^{12}$ or more; $1\times10^{13}$ or morel $1\times10^{14}$ or more; $1\times10^{15}$ or more; $1\times10^{16}$ or more; $1\times10^{17}$ or more; $1\times10^{18}$ or more; $1\times10^{19}$ or more; or $1\times10^{20}$ or more).

The particle can comprise any suitable material. For example, the particle can comprise a metal, a metalloid, a nonmetal, derivatives thereof, or combinations thereof. The particle can, for example, comprise a semiconductor, a ceramic, a transparent conducing oxide, a polymer, a carbon material, a metal (e.g., an alloy), a nitride, an oxide, a silicide, a germanide, a carbide, a derivative thereof, or a combination thereof.

In some examples, the particle can comprise Be, B, C, Mg, Al, Si, P, S, Ca, Sc, Ti, V, Cr, Mn, Fe, Co, Ni, Cu, Zn, Ga, Ge, As, Se, Sr, Y, Zr, Nb, Mo, Tc, Ru, Rh, Pd, Ag, Cd, In, Sn, Sb, Te, Ba, Hf, Ta, W, Re, Os, Ir, Pt, Au, Hg, Tl, Pb, Bi, Po, La, Ce, Pr, Nd, Pm, Sm, Eu, Gd, Tb, Dy, Ho, Er, Tm, Yb, or a combination thereof.

In some examples, the particle comprises a metallic particle. In some examples, the metallic particle comprises a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the metallic particle comprises a metal selected from the group consisting of Al, Cr, Mn, Fe, Co, Ni, Cu, Mo, Pd, Ag, Pt, Au, and combinations thereof.

The particle can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, atomic force microscopy, x-ray microscopy, and/or dynamic light scattering.

In some examples, the particle can have an average particle size of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometers (microns, μm) or more, 1.25 μm or more, 1.5 μm or more, 1.75 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, or 90 μm or more). In some examples, the particle can have an average particle size of 100 micrometers (microns, μm) or less (e.g., 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, or 2 nm or less). The average particle size of the particle can range from any of the minimum values described above to any of the maximum values described above. For example, the particle can have an average particle size of from 1 nanometer (nm) to 100 micrometers (microns, μm) (e.g., from 1 nm to 100 nm, from 100 nm to 100 μm, from 1 nm to 10 nm, from 10 nm to 100 nm, from 100 nm to 1000 nm, from 1000 nm to 10 μm, from 10 μm to 100 μm, from 10 nm to 100 μm, from 1 nm to 90 μm, from 10 nm to 90 μm, or from 1 nm to 1000 nm).

In some examples, the particle can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The particle can comprise a particle of any shape (e.g., a sphere, a rod, a quadrilateral, an ellipse, a triangle, a polygon, etc.). In some examples, the particle can have a regular shape, an irregular shape, an isotropic shape, or an anisotropic shape. In some examples, the particle has a substantially spherical shape.

Figure 6:
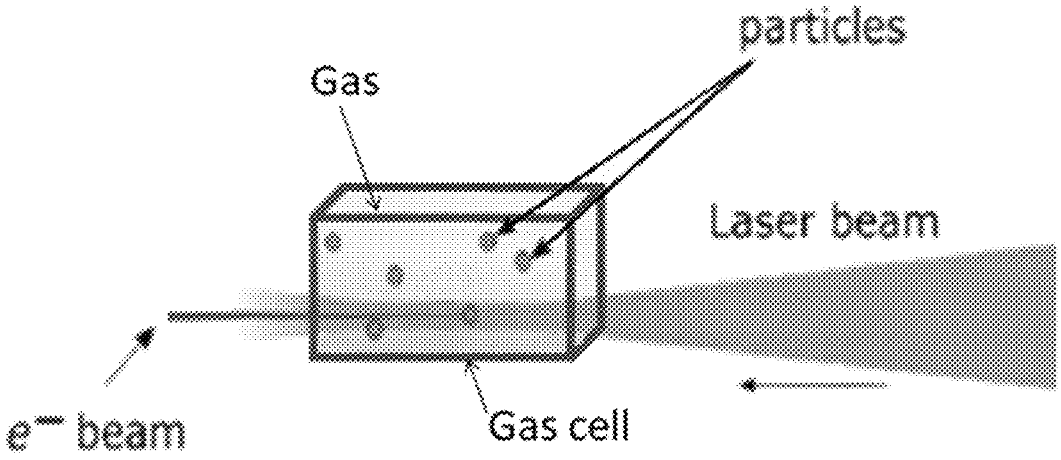
FIG. 6 is a schematic illustration of an example device as disclosed herein according to one embodiment.

The accelerator chamber, comprising the low density gas and the particle, is configured to receive a pulse, the pulse being configured to ionize at least a portion of the low density gas, thereby generating a plasma wave (e.g., a wakefield) comprising electrons in the accelerator chamber. The pulse is further configured to ionize at least a portion of the particle, thereby generating free electrons. At least a portion of the electrons from the plasma and at least a portion of the free electrons are injected into the wakefield, said portion of the electrons from the plasma and said portion of the free electrons being the injected electrons. The injected electrons are accelerated by the wakefield, for example to thereby generate an electron beam. If the acceleration length is long enough, initial acceleration in the wakefield can be followed by further acceleration in a plasma wakefield (PWFA) driven by the initial wakefield accelerated electron bunch. Electrons accelerated in this second process can reach even higher energies. An example device is shown in FIG. 6.

The injected electrons can be accelerated to an energy of 10 Giga-electron Volts (GeV) or more (e.g., 15 GeV or more, 20 GeV or more, 25 GeV or more, 30 GeV or more, 35 GeV or more, 40 GeV or more, 45 GeV or more, 50 GeV or more, 60 GeV or more, 70 GeV or more, 80 GeV or more, 90 GeV or more, or 100 GeV or more).

In some examples, the injected electrons can be accelerated to an energy that is greater than the energy generated in the absence of the particle by 400% or more (e.g., 425% or more, 450% or more, 475% or more, 500% or more, 525% or more, 550% or more, 575% or more, 600% or more, 650% or more, 700% or more, 750% or more, 800% or more, 900% or more, or 1000% or more).

In some examples, the device further comprises a particle injector configured to inject the particle into the accelerator chamber. Any suitable particle injector can be used. In some examples, the particle injector comprises a gas jet. In some examples, the particle injector comprises an aerodynamic lens configured to inject a stream of particles into the accelerator chamber.

In some examples, the device further comprises a particle source configured to provide the particle.

Figure 7:
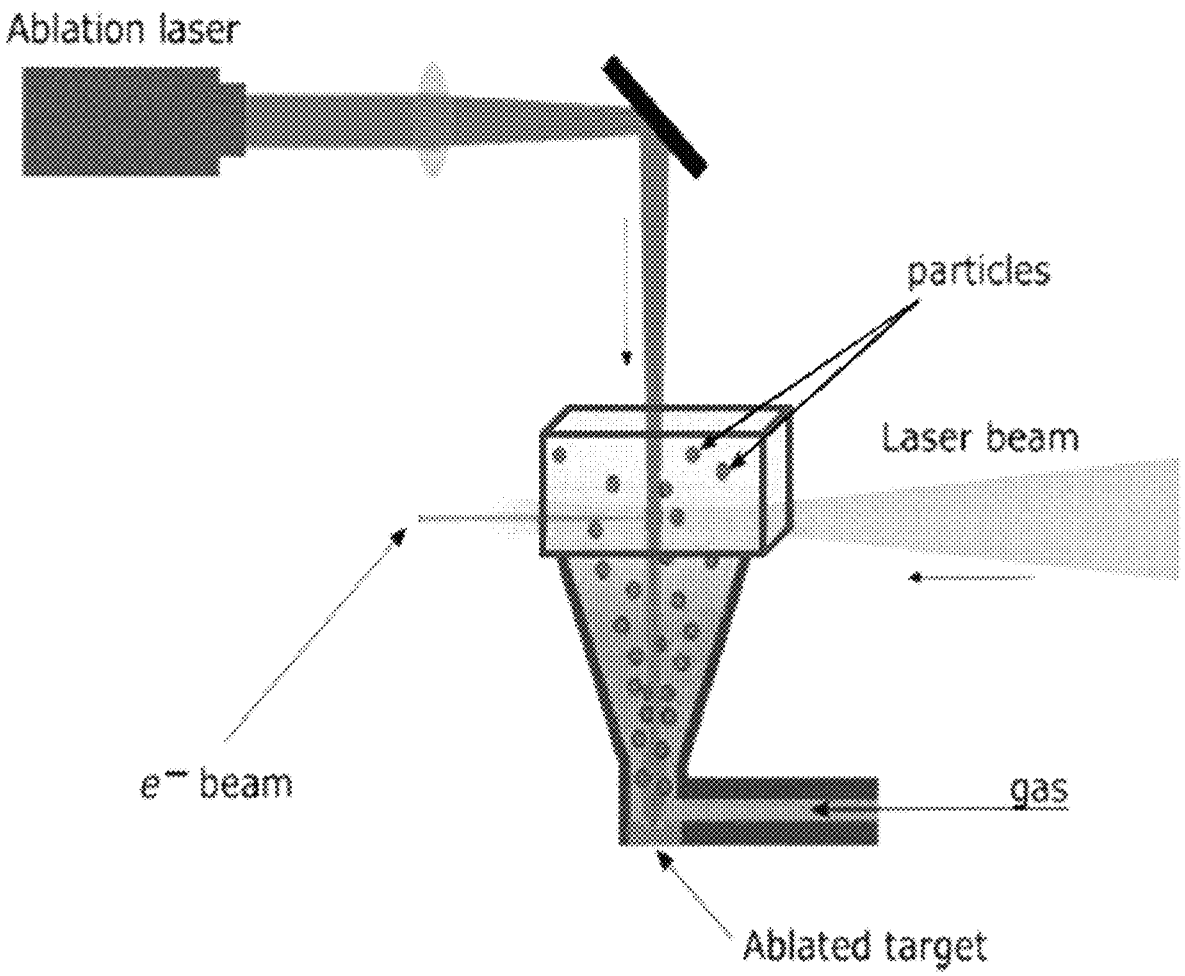
FIG. 7 is a schematic illustration of an example device as disclosed herein according to one embodiment.

In certain examples, the particle comprises a metallic particle and the device can further comprise an ablation laser configured to ablate a metal target, thereby generating the metallic particle, as shown in FIG. 7.

In some examples, the pulse comprises a laser pulse. In some examples, the device can further comprise a laser source configured to generate the laser pulse.

In some examples, the pulse has a defocusing length that is greater than the length of the acceleration chamber.

Also disclosed herein are methods of generating an electron beam using any of the devices disclosed herein. Also disclosed herein are methods of using the electron beam generated by the methods disclosed herein.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—Beyond 10 GeV Laser Wakefield Acceleration with Nanoparticle Injection The collision of ultra-intense laser fields with highly relativistic electron beams is the only currently known way to create EM-fields beyond the Schwinger limit, which gives the best chance to observe quantum processes in strongly relativistic fields. Since no current high energy electron accelerator has a co-located ultrahigh intensity laser, the only feasible way is to use the laser itself to accelerate the electron beam via wakefield acceleration. Furthermore, laser-wakefield acceleration has the potential of shrinking ~km scale facilities down to room size machines affordable for individual users such as hospitals, companies, etc., and even make them small enough to be mobile. Thus, GeV electron beams would be available for many applications at comparatively low cost and large availability. GeV electron beams drive the most modern light sources like Linac Coherent Light Source at SLAC and the Advanced Photon Source at Argonne National Laboratory. They have revolutionized research in material science, medical and drug research, security and non-proliferation, and many other areas. Unfortunately, these facilities are highly oversubscribed, and available beam time is limited, especially for private commercial users and classified national security applications. Building more large-scale accelerator facilities, however, is prohibitively expensive. Laser-driven electron accelerators can solve this problem, as they can create and employ accelerating gradients that are 10,000× (>GV/cm vs. ~10 MV/m). Thus acceleration to the same energies can be achieved over 1000-10,000 times shorter distances. Even when accounting for the laser and associated hardware, the result is room-sized machines rather than ~km scales.

While the proof-of-principle experiments have long since demonstrated the real potential, laser-accelerators are still laboratory experiments rather than functional machines, and beams are still inferior in many aspects to those of conventional accelerators. Detailed physics understanding of the acceleration process and how to control it in detail is the subject of current leading-edge research and development. A primary research goal worldwide is to keep the acceleration process active long enough to reach >10 GeV electron energy in a single acceleration stage. This is an identified requirement for both laser-driven XFELS and laser-based colliders. Other significant research efforts are centered on controlling beam parameters like charge, divergence, and energy spread.

Results. A method capable of increasing the beam energy and controlling other beam parameters is nanoparticle-assisted wakefield electron acceleration (NA-LWFA).

Figure 2:
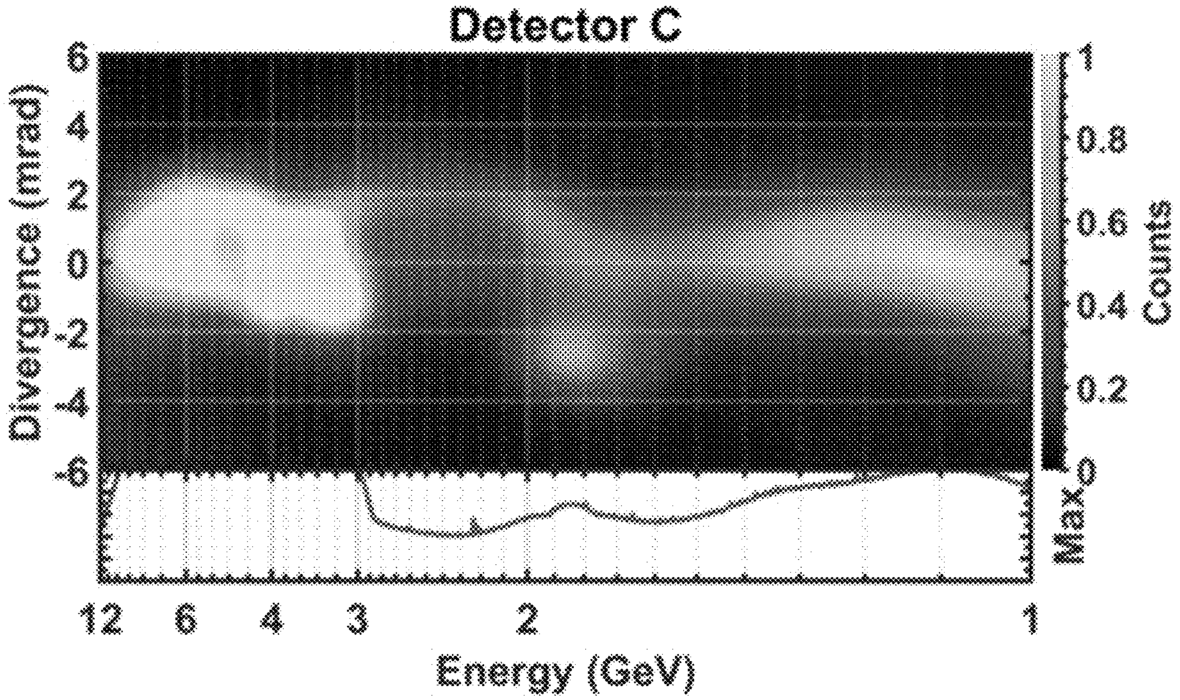
FIG. 2. Wakefield acceleration at Texas Petawatt Laser with nano-particle injection can boost the peak energy to >10 GeV. However, exact beam properties depend on the detailed spatio-temporal overlap of nano-particles with the driver laser pulse.
Figure 3:
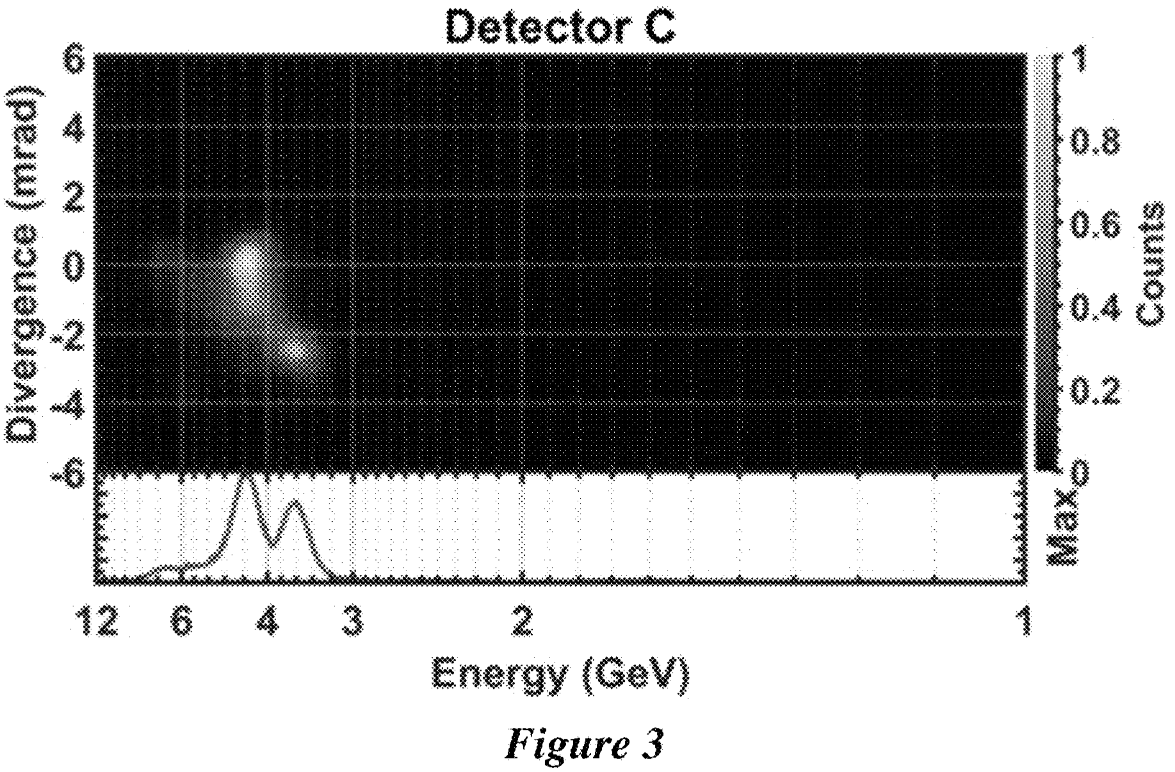
FIG. 3. Wakefield acceleration at Texas Petawatt Laser with nano-particle injection can result in a spectrum that exhibits narrow peaks, observed at ~6 GeV. Exact beam properties depend on the detailed spatio-temporal overlap of nano-particles with the driver laser pulse.

Using a modified NA-LWFA method, the acceleration of electron bunches to peak energies of >10 GeV using the Texas Petawatt laser at power levels of ~0.8 PW demonstrated. The electrons were accelerated in a helium-filled gas cell of 10 cm length with no additional guiding structures such as capillaries or preheated plasma channels. Electron injection into the wake was triggered by aluminum nanoparticles distributed throughout the helium gas. A 4-5× enhancement in electron energies was observed for optimal conditions, from −2-3 GeV to ~>10 GeV peak energies, as shown in FIG. 1-FIG. 3. The observed beam charge is in the nano-Coulomb range, and beam divergences are on the order of 1-2 mrad. Individual electron peaks observed in some shots exhibit energy spreads of only a few percent. The results from the first proof-of-principle experiment with a petawatt laser exhibit large stochasticity because the Texas Petawatt laser is a single shot laser (~4 shots/day) with significant laser pulse fluctuation in the wavefront. However, over multiple years of wakefield experiments without nanoparticles, no energies >2.5 GeV have been observed over hundreds of shots. In a single experiment with nanoparticles, all shots that produced an electron beam at all peak energies are larger than 3 GeV, often 5-7 GeV, and at least two occasions larger 10 GeV. The nanoparticles were distributed randomly throughout the entire acceleration volume, adding further stochasticity to the process, sometimes resulting in a nanoparticle being in the perfect spot for maximum energy, while on other shots multiple nanoparticles contribute to the acceleration, producing multiple electron bunches.

Furthermore, this method can also work on smaller, sub-PW laser systems, making it attractive in a broad range of applications and systems. Proof-of-principle NA-LWFA experiments using the 100 TW laser beamline at CoReLS showed a ~50% increase in beam energy, a ~3× decrease in divergence, and a ~10× decrease in energy spread.

The previous record in LWFA was achieved in an experiment done by a team at the BELLA Center at Lawrence Berkeley National Laboratory. They produced a 7.8 GeV electron beam, a world record at the time, using a very complicated setup including a 20 cm discharge capillary, a laser heater, and a 0.88 PW primary laser. Although this kind of design produces very high electron energy, it also suffers from many drawbacks. For instance, the main laser and laser heater pointing stability has to be extremely good as the capillary's inner diameter is a few 100 of microns. The target in the system described herein, on the other hand, is 3 cm wide with a 3 mm pinhole opening. Another problem is related to the discharge capillary, which requires an elaborate pulsed power setup. Also, the capillary damages quickly due to the electrical discharge, which poses severe challenges for high repetition rate operation. The target in the system described herein does not use any electrical discharge or pulsed power and thus does not suffer from the same problems. Additionally, the capillary wall makes any optical probing of the interaction region very hard, whereas the gas cell in the system described herein provides much easier access for diagnostics. Last but not least, the LBNL setup required a 20 cm target to achieve 7.8 GeV, whereas the setup described herein reached >10 GeV over only 10 cm.

Further research can be done to understand and control the complex nanoparticle-laser interaction and injection physics. The first results suggest the observed energy was limited by the target size, not the physics. What governs the injection physics and the dependence on nanoparticle properties such as size, material, and position can be further investigated. The multi-particle injection has been observed on some but not all shots. The degree to which the demonstrated gains can be transferred to smaller, high repetition rate systems can be further investigated, and whether the gains be increased even further by further optimization.

In additional experiments, the particle energy achievable with a single TPW driven stage will be maximized. The acceleration dependence on laser parameters and target parameters will be investigated to optimize electron beam charge and emittance, and a detailed understanding of nanoparticle physics can be gained by fielding advanced diagnostics. These goals can be achieved by gathering more experimental data and more and improved diagnostics and optimized targets, and running simulations of the experiments to understand the detailed mechanism. Using the PIC code PSC, with unique Adaptive Mesh Refinement capability, large-scale, high-resolution simulations can be executed. PSC was used to successfully model the first AWAKE experiment (Moschuering, N. et al. "First fully kinetic three-dimensional simulation of the AWAKE baseline scenario." *Plasma Physics and Controlled Fusion* 61.10 (2019): 104004).

The results herein indicate that the observed electron energy is limited by the target's length, currently 10 cm. Thus, in additional experiments, a longer target (15-20 cm) will be used, with which it is believed that electron energies of ~15 GeV are feasible. The ability to obtain very narrow energy spread simultaneously with the highest peak energy will also be investigated.

Such experiments can provide a detailed understanding of >10 GeV laser-based electron acceleration and potential gains of up to 15-20 GeV from a single stage. Control of other beam parameters such as charge, emittance, and energy spread can also be achieved. The results can bring plasma-based electron acceleration closer to applications. Furthermore, the developed techniques, targets, diagnostics, and algorithms can be used on other facilities to upscale or downscale the results for the specific applications.

Example 2—Beyond 10 GeV Electron Beams Via Nanoparticle Assisted Laser Wakefield Acceleration Laser-wakefield acceleration has the potential of shrinking ~km scale facilities down to room size machines. A primary research goal worldwide is to keep the acceleration process active long enough to reach >10 GeV electron energy in a single acceleration stage. This is an identified requirement for both laser-driven XFELS and laser-based colliders.

Figure 4:
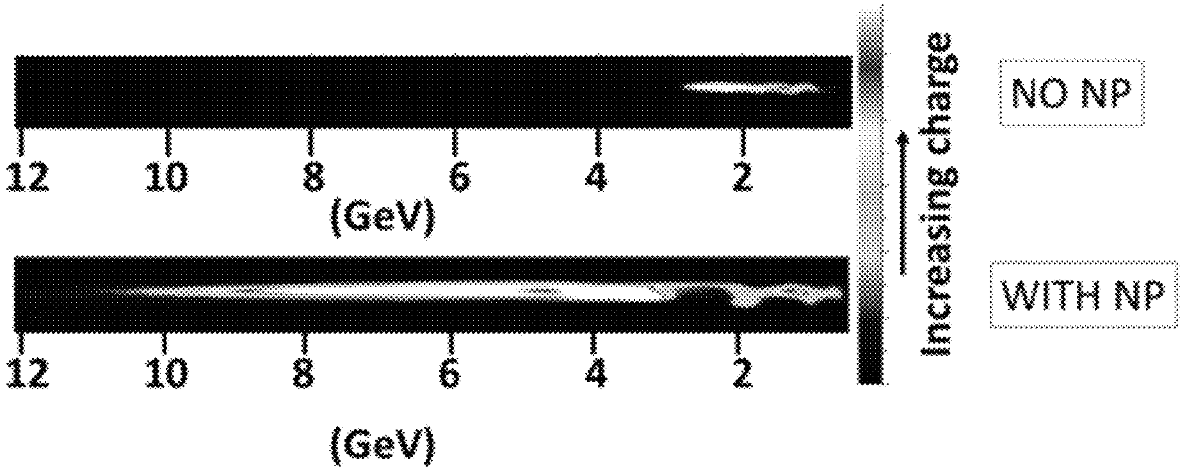
FIG. 4. Wakefield acceleration at Texas Petawatt Laser: (top) no nanoparticles results in broad spectrum 2-3 GeV peak energy. With nano-particle injection energy is boosted to >10 GeV (bottom).

Electron acceleration to >10 GeV energy at the Texas Petawatt using nanoparticle-assisted Laser Wakefield Acceleration has been demonstrated. This is a factor ~5× increase over previous results on the same laser system (Wang, X. et al., *Nat. Commun.* 4, (2013)). The electrons were accelerated in a He-filled gas cell of 10 cm length with no additional guiding structures. Electron injection and acceleration are assisted by aluminum nanoparticles distributed throughout the helium gas. Peak energies >10 GeV were observed, as shown in FIG. 4. The observed charge was in the nano-Coulomb range, and beam divergence was ~0.5 mrad.

The research on nano-LWFA can be extended towards even higher electron energies, aiming at 15-20 GeV from a single stage, driven by the Texas Petawatt laser. These results can be transferred to higher repetition rate (sub- and multi-) petawatt (PW) lasers to improve control over the beam parameters. The achievable energy in LWFA is affected by the dephasing between electron and wakefield, laser pump depletion, and defocusing. In the experiments at the Texas Petawatt laser, pump depletion is not an issue, and the dephasing length can be estimated as:

$$L_{deph}=\lambda_p^2/\lambda^2 a_0$$

where $\lambda_p$ is the plasma wavelength, and $a_0$ is the normalized vector potential. In the experiments described herein, $a_0=3$ and $\lambda_p=43.1$ μm, yielding a dephasing length $L_{deph}=21.7$ cm, which is much longer than the 10 cm long gas cell, suggesting that the achieved peak energy of 10.4 GeV be increased further by increasing the gas cell length. Using validated fluid dynamics simulations, an improved version of the nano-LWFA target that will allow for longer acceleration length and better control of the nano-particle injection can be developed. This target can be fielded at experiments on the Texas Petawatt laser, together with advanced probe interferometry as demonstrated by H.-E. Tsai (Dissertation. UT Austin (2015)). The targets can also be adapted to shorter pulse, higher repetition rate petawatt systems. Extended simulations can be performed to understand the physical mechanisms underlying nanoparticle-assisted LWFA. For example, the PIC code PSC, with unique Adaptive Mesh Refinement capability, can enable large-scale, high-resolution simulations. PSC was used to successfully model the first AWAKE experiment (Moschuering, N., et al. *Plasma Physics and Controlled Fusion* 61.10 (2019): 104004).

Recent experiments on the Texas Petawatt Laser have accelerated 100 pC of charge to 10 GeV in a single LWFA stage. Additional experiments would be focused on improvements in stability, reproducibility, and tunability. Beyond fulfilling these goals, the versatility of the proposed technique makes it interesting for a wide range of applications.

The goal of the project is to demonstrate a stable 10-15 GeV single-stage laser-wakefield accelerator. Experiments will be performed on the Texas Petawatt laser, including designing and fielding a modified nanoLWFA target to increase the acceleration length and better control the nanoparticles. (Alternatively, other lasers besides the Texas Petawatt laser can be used.) Higher repetition rates and stability of the laser paired with better nanoparticle control can enable better control of electron beam parameters. These efforts can be supported by advanced PIC simulations.

This project can yield a stable, single-stage laser-accelerator producing 10-15 GeV electron beams with >100 pC charge. The target is very robust, not needing capillaries or heater beams, and much less prone to damage. Better control of the nanoparticles can enable control of other beam parameters such as charge and emittance, which can be important for eventual applications such as wakefield-driven FELs, or a unit stage in a laser-based electron collider. The results have the potential to change paradigms in the field of plasma-based electron acceleration and beyond.

Example 3—Nanoparticle Assisted Electron Wakefield Accelerator

Described herein are systems and methods using nanoparticles to trigger the injection of electrons into a plasma wakefield. This allows better control of the injection process and thus the subsequent acceleration process. Nanoparticle injection can control the location and timing of the injection, the number of electrons injected, the number of electron bunches that are accelerated, and the beam properties of the accelerated electrons: particle energy, beam divergence, and pulse length, i.e., spatial and temporal emittance, as well as the number of electrons per bunch and the number of bunches.

First experiments at the Texas Petawatt Laser have shown an increase of more than 5× in particle energy over the old method without nanoparticles, demonstrating for the first time >10 GeV electrons from a laser accelerator and achieving a community milestone chased for more than a decade. 10 GeV single-stage electrons are a requirement for laser-driven e+e− colliders as well as for laser-driven XFELS.

The systems and methods described herein also work on smaller laser systems enabling higher pulse energy for a given laser system as well as improved other beam parameters and is therefore important in ANY future application of laser-electron accelerators and light sources.

The systems and methods described herein improve the energy of laser-accelerated electrons and enables full control of several beam parameters of laser-accelerated electrons (charge, emittance, energy, pulse duration). As a result, the systems and methods described herein provide better control and better parameters for identical laser systems. The systems and methods described herein enable >10 GeV energies from Petawatt lasers.

The systems and methods described herein enable the maximum possible acceleration length for a given set of laser and target parameters, enable controlled injection of electrons into accelerating wakefield, and control of beam parameters. The systems and methods described herein works for a broad range of wakefield accelerators: laser-driven, beam-driven, over a large range of density, a gas jet, gas cell.

The systems and methods described herein are simpler, more compact, and more versatile than other methods. The systems and methods described herein achieve higher energies in only half the length and, with a much simpler setup than other methods, do not use multiple large laser beams or inherently damage-prone discharges.

The systems and methods described herein can have one or more of the following benefits: 5× increase in energy, 2× improvement in emittance, shortening of pulse duration, an increase of charge, and control of bunch number.

The systems and methods described herein can be of interest to accelerator companies, accelerator laboratories, light sources, health care, pharmaceuticals, bioresearch, material science research, homeland security, anybody who uses advanced x-ray sources, synchrotrons, FELs, electron accelerators, etc.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The devices, systems, and methods of the appended claims are not limited in scope by the specific devices, system, and methods described herein, which are intended as illustrations of a few aspects of the claims and any methods that are functionally equivalent are intended to fall within the scope of the claims. Various modifications of the devices, systems, and methods in addition to those shown and described herein are intended to fall within the scope of the appended claims. Further, while only certain representative device elements, system elements, and method steps disclosed herein are specifically described, other combinations of the device element, system element, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A particle-assisted wakefield electron acceleration device comprising:

an accelerator chamber comprising a gas cell and having a length of from 0.5 centimeters (cm) to 500 cm;

the accelerator chamber including a low density gas and a particle therein;

wherein the accelerator chamber is configured to receive a pulse, the pulse being configured to:

ionize at least a portion of the low density gas, thereby generating a plasma wave comprising electrons in the accelerator chamber, said plasma wave being a wakefield; and ionize at least a portion of the particle, thereby generating free electrons;

wherein at least a portion of the electrons from the plasma and at least a portion of the free electrons are injected into the wakefield, said portion of the electrons from the plasma and said portion of the free electrons being the injected electrons; and wherein the injected electrons are accelerated by the wakefield:

to an energy of 10 GeV or more;

to an energy that is greater than the energy generated in the absence of the particle by 400% or more; or a combination thereof.

2. The device of claim 1, wherein the accelerator chamber has a length of from 0.5 cm to 250 cm.

3. The device of claim 1, wherein the gas cell has a volume of from 0.05 $cm^3$ to 50,000 $cm^3$.

4. The device of claim 1, wherein the particle comprises a metallic particle.

5. The device of claim 4, wherein the metallic particle comprises a metal selected from the group consisting of Al, Cr, Mn, Fe, Co, Ni, Cu, Mo, Pd, Ag, Pt, Au, and combinations thereof.

6. The device of claim 1, wherein the particle has an average particle size of from 1 nanometer (nm) to 100 micrometers (μm).

7. The device of claim 1, wherein the particle has a substantially spherical shape.

8. The device of claim 1, wherein the particle is a single particle.

9. The device of claim 1, wherein the particle is a plurality of particles.

10. The device of claim 1, wherein the low density gas comprises helium.

11. The device of claim 1, wherein the device further comprises a particle injector configured to inject the particle into the accelerator chamber.

12. The device of claim 1, wherein the device further comprises a particle source configured to provide the particle.

13. The device of claim 12, wherein particle comprises a metallic particle and the device further comprises an ablation laser configured to ablate a metal target, thereby generating the metallic particle.

14. The device of claim 1, wherein the pulse comprises a laser pulse.

15. The device of claim 14, further comprises a laser source configured to generate the laser pulse.

16. The device of claim 1, wherein the pulse has a defocusing length that is greater than the length of the accelerator chamber.

* * * * *